3,201,774
ELECTRICAL SENSING APPARATUS
Mikio Uemura, Ukyo-ku, Kyoto, Japan, assignor to Tateisi Denki Kabushikikaisha, Ukyo-ku, Kyoto, Japan, a corporation of Japan
Filed Dec. 26, 1962, Ser. No. 247,254
6 Claims. (Cl. 340—258)

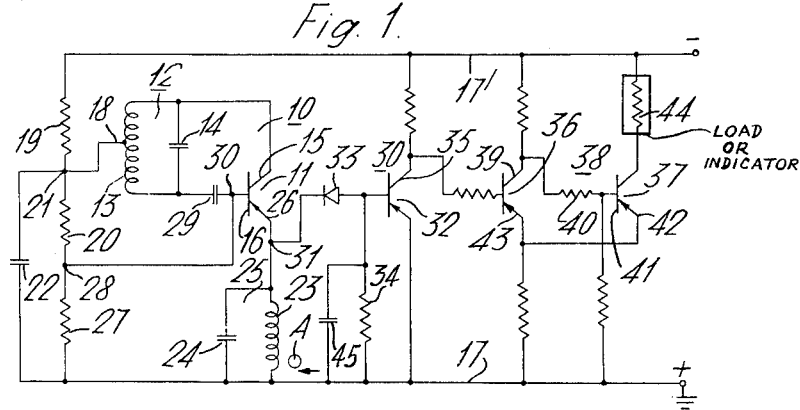
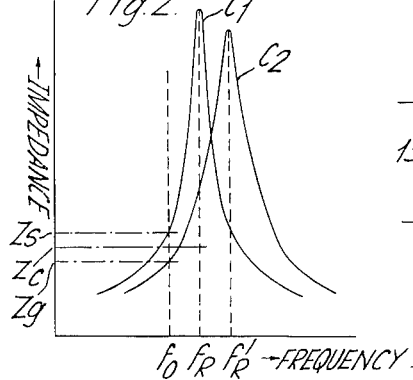
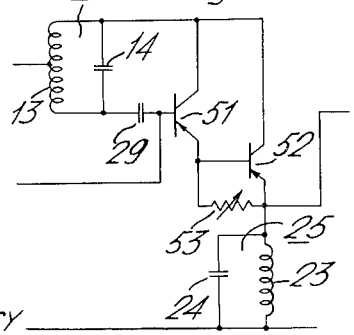
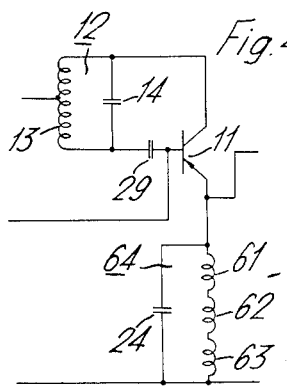
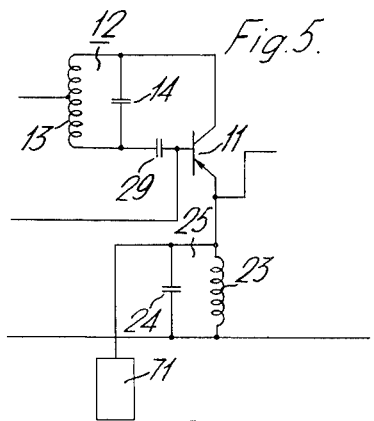

This invention relates to a sensing apparatus and more particularly to an electrical apparatus for sensing the presence of an object.

Many types of electrical sensing apparatus are known and in wide use today. They comprise an electrical oscillator including a tank circuit made up of an inductance and a capacitance which determine the oscillating frequency of the oscillator and which are alternatively used as a pickup unit to which an object to be sensed is to be brought near. When the oscillator is oscillating, the introduction of an object into the field of the pickup unit changes the amplitude of the oscillations, with a slight change in the frequency thereof. From such a change in the amplitude of oscillations may be derived an indication of the presence or absence of an object within the field of the pickup unit. It is explained that this change in the amplitude of the output of the oscillator is chiefly caused by eddy current losses induced within the tank circuit. Then, in order to detect the presence of an object by means of eddy current losses, it is necessary that the object should create eddy current losses great enough to change the amplitude of the oscillations of the oscillator, and since eddy current occurs only in conductive material the prior art apparatus can be used only with objects of conductive material.

Accordingly, it is one object of the invention to provide a new and improved electrical sensing apparatus which operates on different principles from those on which the prior art devices are based. In accordance with the present invention, the presence or absence of an object being sensed is indicated not by changes in the amplitude of oscillations as in the prior art devices with the tank circuit as a pickup unit, but by the presence or absence of the oscillations caused through control of the amount of feedback in the oscillator. To accomplish this, the apparatus of the invention is provided with not only a tank circuit but also a resonant circuit inserted in the feedback circuit of the oscillator, the resonant circuit comprising a capacitance and an inductance, either of which may be used as the pickup unit. When an object is within the field of the pickup, it changes the feedback impedance of the resonant circuit. This controls the amount of the feedback so as to start or stop the oscillations of the oscillator.

Another object of the invention is to provide a sensing apparatus as aforesaid which is capable of detecting objects of not only conductive but also non-conductive material. The capability of detecting non-conductive material is attributed to the arrangement of the apparatus of the invention that the tank circuit included therein is not employed as a pickup to which an object to be sensed is to be brought near. In order to control the amount of feedback in the oscillator, the resonant circuit is so designed that its capacitance may vary as an object comes near it.

Another object of the invention is to provide a sensing apparatus characterized by distinctive and quick action, even when the amplitude of the oscillation of the oscillator changes gently such as by slow entry of an object into the detector field.

Still another object of the invention is to provide a sensing apparatus in which the pick-up or detector unit may be used at a long distance from the other parts of the apparatus, yet requiring only a single lead for connecting the unit to the apparatus.

Other objects, features and advantages of the invention will be apparent from the following detailed description of preferred embodiments of the invention with reference to the accompanying drawings wherin:

FIG. 1 is a diagram of one embodiment of the sensing apparatus of the invention;

FIG. 2 is a graph of resonance curves of the resonant circuit included in the apparatus of the invention, illustrating certain principles of operation of the apparatus;

FIG. 3 is a diagram of a modification of the oscillator circuit shown in FIG. 1;

FIG. 4 is a diagram of a modification of the pickup unit shown in FIG. 1; and

FIG. 5 is a diagram of a portion of another embodiment of the invention.

Referring now in detail to the drawings, the embodiment shown in FIG. 1 is especially suitable for use in detecting objects of conductive material. The basic element of the apparatus is a Hartley oscillator 10 including a transistor 11 and a tank circuit 12. The circuit 12 comprises an inductance 13 and a capacitance 14 which determine the oscillating frequency $f_0$ of the oscillator 10. The circuit 12 is connected between the collector 15 and the base 16 of transistor 11. The oscillator is connected by leads 17, 17' to a suitable direct current source and is kept ready to oscillate by noise voltage always present in the circuits associated with the transistor, resistors, or source. The output of the oscillator appears in the emitter circuit of transistor 11. A tap 18 on the coil 13 of the tank circuit is connected to the emitter 26 of transistor 11 through a point 21 between resistors 19 and 20, a capacitor 22 and a resonant circuit 25 comprising a parallel combination of an inductance 23 and a capacitance 24. The capacitance may be replaced by a distributed capacitance. The circuit including these elements constitutes the feedback circuit of oscillator 10. A point 28 between resistors 20 and 27 is connected to a point 30 between the base 16 of transistor 11 and a capacitor 29. The resistor 27 determines the base voltage of transistor 11 and the capacitor 29 is placed to block the flow of direct curernt through the circuit. The resistors 19, 20 and 27 are serially placed between leads 17 and 17'.

The inductance 23 of the resonant circuit 25 is used as a pickup unit. The resonant frequency $F_r$ of the resonant circuit and the oscillating frequency $f_0$ of the oscillator are predetermined respectively so that there may be a difference between the two values.

The output of oscillator 10 is applied as an input signal to a NOT circuit 30 which comprises a transistor 32 whose base is connected at a point 31 to the emitter circuit of transistor 11 through a diode 33. The parallel circuit consisting of resistor 34 and capacitor 45 connected to lead 17 establish operating conditions for diode 33. The high-frequency output of oscillator 10 is rectified by diode 33 and the resultant halfwaves are applied to the base of transistor 32. The NOT circuit also acts as an amplifier.

When the oscillator is not oscillating and there is no high-frequency output therefrom, a signal appears at the collector 35 of transistor 32 of the NOT circuit. This output signal is applied as an input to a wave-shaping circuit 38 comprised of transistors 36 and 37 which are connected in such a manner that the collector 39 of transistor 36 is connected through a resistor 40 to the base 41 of transistor 37 whose emitter 42 is connected to the emitter 43 of transistor 36. The collector circuit of transistor 37 has a load 44, for example, a relay placed therein, from whose operation may be derived an indication of the presence or absence of an object in the field of the pickup.

Now let it be assumed that under normal conditions, that is, without any conductive material near the pickup, the resonant frequency $F_R$ of the resonant circuit 25 is predetermined by the inductance 23 and capacitance 24 to be higher than the oscillating frequency $f_0$ of the oscillator 10, which is predetermined by the elements of the tank circuit. The resonance curve of the circuit 25 may be plotted as $C_1$ in FIG. 2. If the oscillator gets started by noise voltage always present in the circuits associated with the transistor, resistors or source, a high-frequency feedback current at the oscillating frequency $f_0$ would normally flow through the resonant circuit. However, as shown in FIG. 2, the impedance $Z_s$ at the resonant circuit offered to the feedback of the oscillating frequency $f_0$ is higher than the impedance $Z_c$ which would pass a maximum amount of feedback necessary for oscillations to be maintained in oscillator 10. Then, so long as the impedance of the resonant circuit is kept at $Z_s$, no feedback current will flow therethrough, thus preventing oscillations from starting in the oscillator.

When an object A is brought into the field of inductance 23 of the resonant circuit, the effective value of the impedance thereof decreases, so that the resonant frequency thereof rises from $F_R$ to $F_R'$. The resonance curve of the resonant circuit has been shifted rightwards and is now shown as $C_2$ in FIG. 2, and the impedance of the resonant circuit to be offered to the output of the oscillator having the frequency $f_0$ decreases to $Z_g$, which is obviously lower than the critical impedance $Z_c$ of the resonant circuit. Then a sufficient amount of current is fed back through the resonant circuit to start and maintain oscillations in the oscillator.

In the above embodiment the resonant frequency $F_R$ of the circuit 25 is preset at a higher value than the oscillating frequency $f_0$ of oscillator 10, so that the oscillator operates only if and when an object being sensed comes into the field of the pickup. The former frequency may of course be preset lower than the latter. Then the oscillator oscillates under normal conditions, that is without any object within the field of the pickup, and the oscillations are stopped when an object enters the field of the pickup. This requires that the resonant circuit should be designed so that its impedance may be increased by the presence of an object near it from a value lower than $Z_c$ to a value higher than it.

When the oscillator is oscillating, its output is applied as an input signal to the NOT circuit 30. Then this circuit produces no output, and the relay 44 connected to the collector circuit of transistor 37 in the circuit 38 is energized to give an indication of the presence or absence of an object in the field of the pickup. On the other hand, when the oscillator is not in operation, the NOT circuit produces an output signal, so that the relay 44 is not energized. In this manner the relay is actuated only when the oscillator is oscillating. In order that the relay may be energized when the oscillator is not in operation and de-energized when the oscillator is oscillating, the NOT circuit may be eliminated or another NOT circuit may be added thereto.

As described above, in the apparatus of the invention the resonant frequency of the resonant circuit is changed by the presence of an object in the field of the pickup, whereby the impedance of the resonant circuit to be offered to the feedback of the oscillator is caused to change passing through, that is, from above to below or from below to above the critical value $Z_c$ which passes a minimum amount of feedback necessary for oscillations to be maintained in the oscillator, so that the oscillations are started or stopped. The principle is clearly different from that on which the prior art devices operate: that eddy current losses created change the amplitude of the oscillations, thereby giving an indication of the presence or absence of an object.

It is required in the prior art that the distance between the pickup and an object to be sensed should be short enough for eddy current to be induced therein. This is not required of the apparatus of the present invention, which can operate with a far wider detection range. In other words, the apparatus of the invention is superior in sensitivity to the prior art devices.

In some instances it is desired to have the pickup unit separated relatively far from the other component parts of the apparatus. If the distance therebetween is too great, losses in the connecting circuit increase so as to deteriorate the sensitivity of the apparatus. To maintain a high degree of sensitivity, a circuit arrangement as shown in FIG. 3 is effectively employed. In this circuit, the single transistor 11 of FIG. 1, which functions as an amplifier, is replaced by a pair of transistors 51 and 52. Their collectors are connected each to the other and the emitter of transistor 51 is also connected to the base of transistor 52. The mode of connections is customary with conventional two-stage amplifiers. A variable resistor 53 is inserted between the two emitters. It will be seen that the higher the value of the resistor, the greater will be the amplification factor. The amplification factor varies non-linearly as the resistance of the resistor is changed. The resistor is advantageously a variable one to make it easier to obtain a desired amplification factor. To improve the sensitivity of the apparatus the resistor is adjusted to increase the amplification factor. Thus high-frequency current loss, if any caused in the circuit connecting the pickup unit and the other parts of the apparatus far separated therefrom, can be compensated for.

If there are a plurality of objects to be sensed, it is necessary to provide the same number of sensing apparatuses in order to sense all or any one of the objects. In order to detect a plurality of objects with a single apparatus, the circuit arrangement shown in FIG. 4 may be effectively employed. The arrangement is the same as that of FIG. 1 except that the resonant circuit 64 includes a plurality of serially connected inductances 61, 62 and 63, each of which is formed into a pickup unit. The number of inductances to be provided may vary and is determined by the number of objects it is desired to detect. The inductance of the resonant circuit is the sum of the individual inductances. The circuit has a capacitance 24 as before.

Suppose that the resonant circuit is so arranged that its impedance may decrease below the critical impedance $Z_c$ upon introduction of an object into the field of each and every one of the inductances. Then no oscillations will occur until all of the inductances have come to have an object in their respective fields. Suppose on the contrary that the resonant circuit is so arranged that its impedance may increase above the critical impedance $Z_c$ under the same conditions as described just above. Then oscillations will continue until all of the inductances have come to have an object in their respective fields. In this manner the simultaneous presence of objects in the fields of all of the inductances can be detected.

Suppose again that the resonant circuit is so arranged that its impedance may decrease below the critical impedance $Z_c$ upon introduction of an object into the field of any one of the inductances. Then no oscillations will occur until an object enters the field of any one of the inductances. Suppose on the contrary that the resonant circuit is so arranged that its impedance may increase above the critical impedance $Z_c$ under the same conditions as described just above. Then oscillations will be maintained until an object is introduced into the field of any one of the inductances. Thus the presence of an object within the field of any one of the inductances can be detected.

Suppose once again that the resonant circuit is so arranged that its impedance may decrease below the critical impedance $Z_c$ upon introduction of an object into the field of each of a plurality of inductances selected from the plurality of inductances. Then no oscillations will be started until all of said selected plurality of inductances have come to have an object in their respective fields. Suppose on the contrary that the resonant circuit is so arranged that its impedance may increase above the critical impedance $Z_c$ upon introduction of an object into the field of each of a plurality of inductances selected from the plurality of inductances. Then oscillations will be continued until all of said selected plurality of inductances have come to have an object in their respective fields. Thus the presence of an object within the field of each of a plurality of inductances selected from the plurality of inductances can be sensed.

The embodiments described above may be used only with objects of conductive material, because the pickup unit is made of the inductance of the resonant circuit. If the capacitance of the circuit is employed as the pickup, objects of non-conductive material can be sensed. FIG. 5 shows a circuit suitable for the purpose, in which a metallic plate 71 is connected to the resonant circuit and is used as the pickup. When a non-conductive object, for example a human body comes into the field of the plate, its charge is increased and the capacitance of the resonant circuit 25 is also increased. Suppose that the resonant frequency of the circuit 25 is predetermined to have a higher value than the oscillating frequency $f_0$ of the oscillator so that its impedance to the oscillating frequency $f_0$ may increase from below to above $Z_c$ when a non-conductive object is introduced within the field of the plate. Then the increase in the capacitance of the resonant circuit decreases the resonant frequency of the resonant circuit and thus causes the impedance thereof to the oscillating frequency $f_0$ to increase from below to above $Z_c$. This stops the oscillations of the oscillator that has been operating. Suppose on the contrary that the resonant frequency of the circuit 25 is predetermined to have a lower value than $f_0$ so that its impedance to the oscillating frequency $f_0$ may decrease from above to below $Z_c$ when a non-conductive object enters the field of the plate. Then the presence of a human body within the field of the plate will decrease the resonant frequency of the circuit 25, causing the impedance thereof to the oscillating frequency to decrease from above to below $Z_c$ whereby the oscillator that has not been in operation starts its oscillation. The principle of operation in this case is quite the same as that described with reference to FIG. 1. A pair of metallic plates spaced apart and facing each other may be connected across the circuit 25, so that the resonant frequency of the circuit varies as dielectric material comes to be placed therebetween. With this arrangement the level of powder, grains or liquid in a closed vessel may be sensed.

In practice, the apparatus of the invention may be used in different ways. One way is to have no object in the field of the pickup under normal conditions, and sense any object that has come into the field thereof. Another way is to have an object in the field of the pickup under normal conditions, and sense the object having left the field.

It should be recognized that the embodiments disclosed herein are merely representative and that further modifications and changes may be made without departing from the true scope and spirit of the invention.

What is claimed is:

1. Electrical sensing apparatus comprising an oscillator, including a transistor having an inductance-capacitance tank circuit connected in its collector-to-base circuit, a resonant feedback circuit connected between the emitter of said transistor and ground and comprising inductive and capacitive elements, and a feedback connection between ground and said tank circuit, a detector unit including one of the elements of said feedback circuit and having a field thereabout the presence of an object in which causes feedback impedance of said circuit to change through a critical value necessary for maintenance of oscillations, and indicator means connected to said emitter and responsive to predetermined changes in oscillation conditions in said oscillator.

2. The apparatus defined in claim 1 wherein said indicator means includes an amplifier including an input transistor to the base of which the output signal of said oscillator is applied, means responsive to said amplifier for indicating presence of an input signal to said amplifier and a threshold level connection between the oscillator and said amplifier input transistor, said connection comprising a diode having its cathode connected to the emitter of the oscillator transistor and having its anode connected to ground through the base-to-emitter circuit of said amplifier input transistor, and a resistance-capacitance parallel circuit connected between said anode and ground establishing operating conditions for said threshold circuit, whereby gradual changes in oscillation conditions in said oscillator are indicated as distinctive changes in condition in said amplifier.

3. The apparatus defined in claim 2 including a plurality of separate such detector units all having their impedance elements connected in said resonant feedback circuit whereby only simultaneous presence of objects in the fields of all of the units causes said feedback impedance to change through said critical value.

4. The apparatus defined in claim 2 further including amplification factor adjusting means interposed in the emitter circuit of said oscillator transistor, said means comprising a third transistor having common-collector and base-to-emitter connections to said oscillator transistor, and further having its emitter connected to that of the oscillator transistor through a variable resistor, the resonant feedback circuit being connected to the junction between the emitter of said third transistor and said variable resistor, to which junction is also connected to the cathode of said diode.

5. The apparatus defined in claim 2 wherein said indicator means further includes a source of negative D.-C. voltage, the collector of said amplifier input transistor being connected to said source, a second amplifier transistor connected between said source and ground and receiving the collector signal of said input transistor at its base, a third amplifier transistor having a common emitter connection with said second amplifier transistor and receiving the collector signal of said second amplifier transistor at its base, and current responsive means connected between the collector of said third amplifier transistor and said source for indicating current in said collector in response to oscillator output signals.

6. Electrical sensing apparatus comprising a transistor oscillator, including a three-terminal transistor, an inductance-capacitance tank circuit connected in the collector-base circuit of said transistor, a resonant feedback circuit comprising inductance and capacitance elements connected between the emitter of said transistor and ground, and a feedback connection between ground and said tank circuit; a detector unit including one of the elements of said feedback circuit and having a field thereabout the presence of an object in which causes the impedance of said feedback circuit to pass through the critical value necessary for sustaining oscillations; an amplifier circuit including a three element transistor having its emitter connected to ground and its base responsively connected to the emitter of the first-mentioned transistor; a diode interposed in the connection between said transistors; and an indicator circuit connected to the collector of said amplifier transistor for indicating changes in oscillation conditions in said oscillator due to presence of objects in said field.

References Cited by the Examiner

UNITED STATES PATENTS

| | | | |
|---|---|---|---|
| 1,973,414 | 9/34 | Miller | 340—258 |
| 2,041,114 | 5/36 | Carini | 340—258 |
| 2,064,994 | 12/36 | Stirlen et al. | 340—258 |
| 2,083,335 | 6/37 | Loudon | 340—258 |
| 2,100,756 | 11/37 | Shepard | 340—258 |
| 2,422,542 | 6/47 | Gustafsson | 340—258 |
| 2,807,720 | 9/57 | Charles | 331—65 |
| 2,972,116 | 2/61 | Lowe | 331—117 |
| 3,013,256 | 12/61 | Damast | 340—244 |
| 3,015,077 | 12/61 | Elam et al. | 331—65 |
| 3,032,722 | 5/62 | Banasiewicz | 340—258 |
| 3,067,364 | 12/62 | Rosso | 331—117 |
| 3,129,415 | 4/64 | McKnight | 340—258 |

NEIL C. READ, *Primary Examiner.*